US006355749B1

(12) United States Patent
Chung et al.

(10) Patent No.: US 6,355,749 B1
(45) Date of Patent: Mar. 12, 2002

(54) SEMICRYSTALLINE FERROELECTRIC FLUOROPOLYMERS AND PROCESS FOR PREPARING SAME

(75) Inventors: Tze-Chiang Chung, State College; Atitsa Petchsuk, University Park, both of PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 09/730,088

(22) Filed: Dec. 5, 2000

Related U.S. Application Data (60) Provisional application No. 60/209,061, filed on Jun. 2, 2000.

(51) Int. Cl.[7] ...................... C08F 214/22; C08F 214/24; C08F 214/26; C08F 214/28
(52) U.S. Cl. ...................... 526/255; 526/195; 526/196; 526/197; 526/249; 526/250; 526/253; 526/254
(58) Field of Search ................................. 526/255, 196, 526/197, 249, 250, 253, 254, 195

(56) References Cited

U.S. PATENT DOCUMENTS

| | | | |
|---|---|---|---|
| 3,053,818 A | 9/1962 | Honn et al. | 260/80.5 |
| 3,790,540 A | 2/1974 | Dohany et al. | 260/80.77 |
| 4,169,870 A | * 10/1979 | Takahashi | 525/315 |
| 4,554,335 A | 11/1985 | Sakagami et al. | 526/249 |
| 4,577,005 A | 3/1986 | Sako et al. | 526/254 |
| 5,087,679 A | 2/1992 | Inukai et al. | 526/249 |
| 5,635,812 A | * 6/1997 | Eschbach | 320/1 |

FOREIGN PATENT DOCUMENTS

WO  WO 99/26261  5/1999

OTHER PUBLICATIONS

High–Speed electrically Actuated Elastomers with Strain Greater Than 100%, *Science*, vol. 287, pp 836–839, 783, Feb. 4, 2000, Pelrine, et al.
Piezoelectricity and Related Properties of Vinylidene Fluoride and Trifluoroethylene Copolymers, *J. Appl. Physics*, vol. 59, No. 6, pp 2142–2150, Mar. 15, 1986, Koga, et al.
Piezoelectricity of Vinylidene Fluoride–Trifluoroethylene Copolymers, *Ferroelectrics*, vol. 32, pp 85–92, 1981, Higashihata, et al.
Thermal Contraction and Ferroelectric Phase Transition in Vinylidene Fluoride–Trifluoroethylene Copolymers. 1. An Effect of Tensile Strength Along the Chain Axis, *Macromolecules*, vol. 21, pp 2463–2469, 1988, Tashiro, et al.
Thermal Contraction and Ferroelectric Phase Transition in Vinylidene Fluoride–Trifluoroethylene Copolymers. 2. An Effect of Tensile Strength Applied in the Direction Perpendicular to the Chain Axis, *Macromolecules*, vol. 23, pp 802–2806, 1990, Tashiro, et al.
Effects of Electron Irradiation and Annealing on Ferroelectric Vinylidene Fluoride–Trifluoroethylene Copolymers, *J. Appl. Phys.*, vol. 62, No. 3, pp 994–997, Aug. 1, 1987, Daudin, et al.
Electrostriction as the Orogin of Piezoelectricity in Ferroelectric Polymers, *Jpn. J. Appl. Phys.*, vol. 29, No. 4, pp 673–680, Apr. 1990, Furukawa, et al.
Effect of Hydrostatic Pressure and Phase Transition in Ferroelectric Polymers, *Jpn. J. Appl. Phys.*, vol. 37, Pt. 1, No. 9B, pp 5372–5374, 1998, Yuki, et al.
Electrically Induced Ferroelectric Phase Transition of Copolymers Vinylidene Fluoride and Trifluoroethylene, *Jpn. J. Appl. Phys.*, vol. 31, Pt. 1, No. 4, pp 1112–1117, Apr. 1992, Ikeda et al.
Giant Electrostriction and Relaxor Ferroelectric Behavior in electron–Irradiated Poly(Vinylidene Fluoride–Trifluoroethylene), *Science*, vol. 280, pp 2101–2103, 1998, Zhang, et al.
Structure and Deformation Behaviour of a Vinylidene Fluoride–Tetrafluoroethylene–Hexafluoropropylene Terpolymer, *Polymer*, vol. 37, No. 5, pp 831–836, 1996, Freimuth, et al.
Ferroelectric Behaviour of Thin Films of Vinylidene Fluoride/Trifluoroethylene/Hexafluoropropylene Copolymer, *Jpn. J. Appl. Phys.*, vol. 36, Pt. 1, No. 9B, pp 6114–6117, Sep. 1997, Tajitsu, et al.

* cited by examiner

*Primary Examiner*—Fred Zitomer
(74) *Attorney, Agent, or Firm*—Anthony J. DeLaurentis (57) ABSTRACT

A new class of ferroelectric terpolymers having an exceptionally large electrostrictive response (>3%) induced by external electric field at ambient temperature comprise 50–80 mole % of vinylidene fluoride (VDF), 15–40 mole % of trifluoroethylene (TrFE) and 2–20 mole % of at least one bulky monomer, such as chlorotrifluoroethylene (CTFE) or hexafluoropropene (HFP). These semicrystalline terpolymers behave like a ferroelectric relaxor having a rapid electric field-induced mechanical response, due to a low Curie temperature (phase transition between polar and nonpolar crystalline domains at or near ambient temperature) and high dielectric constant. A combination of bulk polymerization and free radical polymerization using oxidation adducts of an organoborane as the free radical initiator may be used to prepare the terpolymers, such that the terpolymers are characterized by good processibility, high purity and uniform molecular structure.

8 Claims, 4 Drawing Sheets

SEMICRYSTALLINE FERROELECTRIC FLUOROPOLYMERS AND PROCESS FOR PREPARING SAME

RELATED APPLICATIONS

This application is based on a Provisional Application, No. 60/209,061 (PSU Reference No. 2000-2282), which was filed on Jun. 2, 2000, and which is entitled "Ferroelectric Polymers With Giant Electrostriction: Based On Semicrystalline Terpolymers Containing Vinylidene Fluoride, Trifluoroethylene and Third Monomer."

This application was developed in connection with a contract with the United States Navy, Contract No. N00014-99-1-443.

FIELD OF THE INVENTION

The present invention relates to a new class of polymeric materials that generate exceptionally high dielectric constant and high electromechanical response at ambient temperature. More particularly, the invention relates to a class of semicrystalline ferroelectric terpolymers comprising vinylidene fluoride (VDF), trifluoroethylene (TrFE), and at least one bulky monomer, such as chlorotrifluoroethylene (CTFE) or hexafluoropropene (HFP) or the like, prepared by borane/oxygen initiation in bulk reaction conditions.

BACKGROUND OF THE INVENTION

Ferroelectric materials that generate mechanical actuation induced by external electric field have attracted a great deal of attention and have been recognized for applications in a variety of transducers, actuators and sensors. Most of the current commercial applications for ferroelectric materials are based on piezoceramics and magnetostrictive materials, despite the fact that they exhibit many deficiencies, such as low strain levels (<0.2%), brittleness, heavy weight, high processing temperatures and processing difficulties when producing parts having complicated shapes. In sharp contrast, ferroelectric polymers exhibit many desirable properties, such as flexibility, light weight, high mechanical strength, an ability to be processed readily into large area films, and an ability to be molded readily into a variety of configurations. However, despite these advantages over ceramic materials, most ferroelectric polymers suffer the disadvantage of having a low electric field sensitivity, in terms of dielectric constant, piezoelectric coefficient, electromechanical coupling coefficient and field induced strain, which limit their applications.

One of the phenomena in ferroelectric polymers that has a great potential in generating high strain with high force level and broad frequency bandwidth is the phase transformation between ferroelectric (polar) and paraelectric (nonpolar) crystalline domains. The crystalline phase change produces large lattice strain and large change in sample dimension. Electrostriction refers to a coupling effect between the strain and the square of polarization, and is a desirable mechanism for achieving a large electric-induced mechanical response. It is interesting to note that the electrostrictive response due to crystalline phase transition is very different from electrostatic force in dielectric elastomers [R. Pelrine, R. Kornbluh, Q. Pei, and J. Joseph, Science, 287, 836, 2000], which can produce a large strain but a very weak force.

Figure 3:
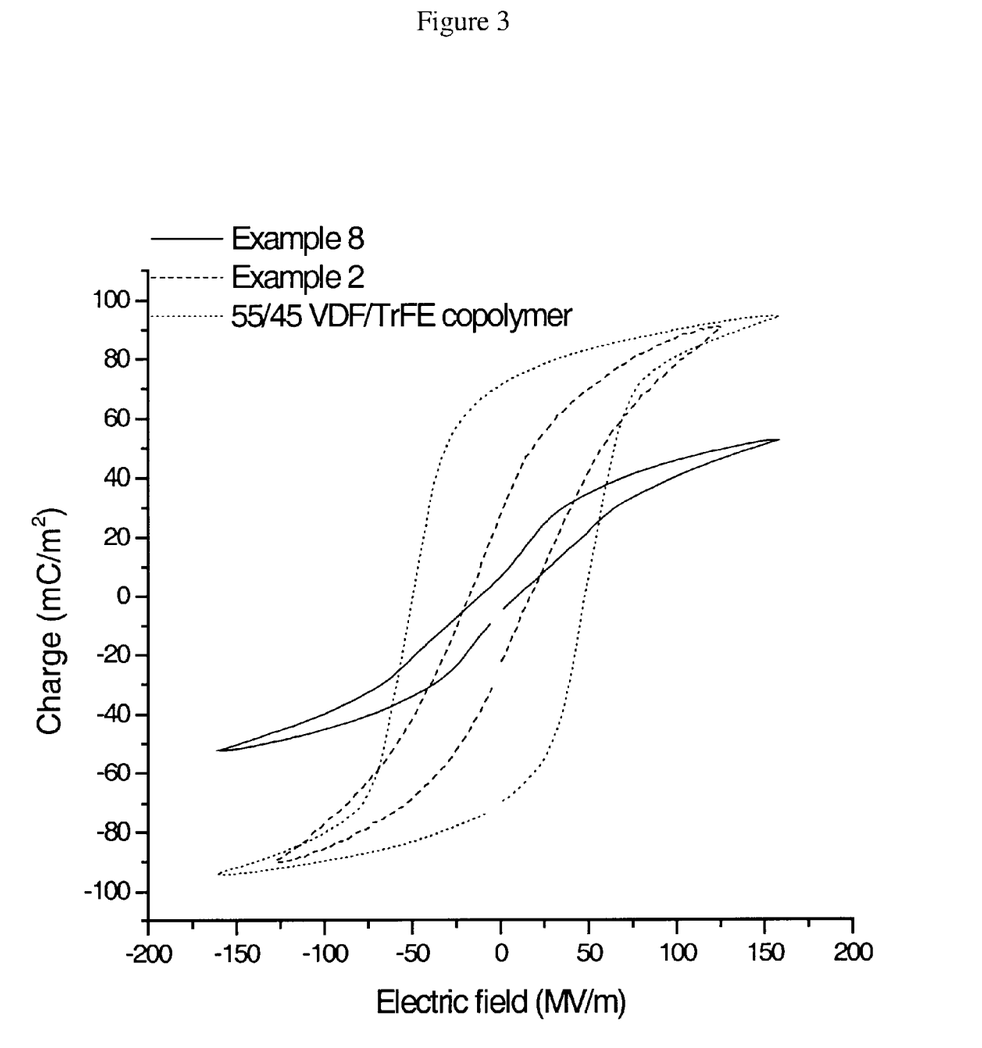
FIG. 3 is a graph comparing the polarization hysteresis loops of two VDF/TrFE/CTFE terpolymers in accordance with the present invention (Examples 2 and 8) with that of a conventional VDF/TrFE copolymer comprising 55 mole % VCD and 45 mole % TrFE.

In the past decade, most of the research activities involving ferroelectric polymers have focussed on ferroelectric fluorocarbon polymers, especially semicrystalline VDF/TrFE copolymers. Many research efforts have been devoted to a general goal of reducing the energy barrier for ferroelectric-paraelectric (Curie) phase transition, and for generating a large and fast electric-induced mechanical (piezoelectric) response at ambient temperature. Although VDF/TrFE copolymers (stretched film poled at 120° C.) exhibit a relatively high piezoelectric constant (on the order of from about 10 pC/N to about 25 pC/N; $pC=10^{-12}$ coulomb and N=newton) [K. Koga, and H. Ohigashi, J. Appl. Phys., 59, 2142,1986], the response of the dipoles to an electric field is very slow at ambient temperature, and the polarization hysteresis loop (polarity vs. electric field) of the copolymer is very large. As shown in FIG. 3, a VDF/TrFE copolymer comprising 55 mole % VDF and 45 mole % TrFE, which exhibits the narrowest polarization hysteresis loop and lowest Curie temperature of the copolymers in the VDF/TrEF family [Y. Higashihata, J. Sako, and T. Yagi, Ferroelectrics, 32, 85, 1981], still exhibits a significantly wider hysteresis loop than those exhibited by the VDF/TrEF/ bulky monomer terpolymers of this invention.

The close connection between crystalline structure and electric properties led to many attempts to alter copolymer morphology by creating non-equilibrium states; and a number of such attempts resulted in ferroelectric polymers that exhibit somewhat improved electric responses. Such attempts have included, for example, subjecting ferroelectric polymers to mechanical deformation [K. Tashiro, S. Nishimura, and M. Kobayashi, Macromolecules, 21, 2463, 1988, and 23, 2802, 1990], electron-radiation [B. Daudin, and M. Dubus, J. Appl. Phys., 62, 994, 1987], uniaxial drawing [T. Furukawa, and N. Seo, Japanese Journal of Applied Physics, 29, 675, 1990], crystallization under high pressure [T. Yuki, S. Ito, T. Koda, and S. Ikeda, Jpn. J. Appl. Phys., 37, 5372, 1998], and crystallization under high electric field [S. Ikeda, H. Suzaki, and S. Nakami, Jpn. J. Appl. Phys., 31, 1112, 1992].

Zhang et al. [Science, 280, 2102, 1998 and WO99/26261] recently reported their work involving electron-radiation treatment of ferroelectric polyvinylidene fluoride polymers. The polymers that were generically disclosed in their work include polyvinylidene fluoride, polyvinylidene fluoride-trifluoroethylene, polyvinylidene fluoride-tetrafluoroethylene, polyvinylidene fluoride-trifluoroethylene-hexafluoropropylene and polyvinylidene fluoride-hexafluoropropylene. However, the only polymers actually prepared and studied were 50/50 and 65/35 copolymers of vinylidene fluoride/trifluoroethylene (VDF-TrFE). The Zhang et al work, which included a systematic study of the radiation conditions, such as dosage, temperature, inert atmosphere, stretching sample, etc., revealed an exceptionally high electrostrictive response (~4%) of the irradiated copolymer that behaves like a relaxor ferroelectric with fast electric-induced mechanical response at ambient temperature. Their work also revealed that the polarization hysteresis loop of the irradiated copolymer became very narrow at room temperature, compared with the hysteresis loop of a sample of the copolymer before irradiation. However, the polarization of the irradiated copolymer also was significantly reduced and the irradiated copolymer became completely insoluble because of the severe crosslinking side reaction that had occurred during the high-energy radiation. The increase of hardness of the irradiated copolymer sample due to the crosslinking also was revealed in its electric response, i.e., a very high electric field (150 MV/m) was required before the irradiated copolymer exhibited a high strain response (~4%). Thus, it appears that irradiating a ferroelectric copolymer not only reduces the polar crystalline domain size, but also produces many undesirable side reactions that increase the amorphous phase and diminish the processibility of the irradiated copolymer. At page 11, lines 25–27 [in WO 99/26261], Zhang et al, in a quite off-handed manner, suggested that the effects achieved by irradiation can be accomplished chemically, by adding a bulky side group to the main polymer chain which operates as an internal plasticizer. Zhang et al provided no examples of bulky side chain additions and made no further reference to chemically modified polymers.

As will be apparent from the following description of the invention, the present approach for altering the crystalline domains, and creating relaxor ferroelectric behavior, of VDF/TrFE copolymers is to introduce into the copolymer structure a controlled amount of bulky monomer units, such as chlorotrifluroethylene (CTFE) and hexafluoropropene (HFP) units, with a homogeneous fashion. The resulting terpolymers are solution and melt processible and form a desirable film morphology with uniform nano-crystalline domains that have Curie (polar-nonpolar crystalline phase) transition at about ambient temperature. Therefore, these terpolymers exhibit exceptionally high dielectric constant at ambient temperature and fast and high electro-mechanical response induced by external electric field.

Figure 1:
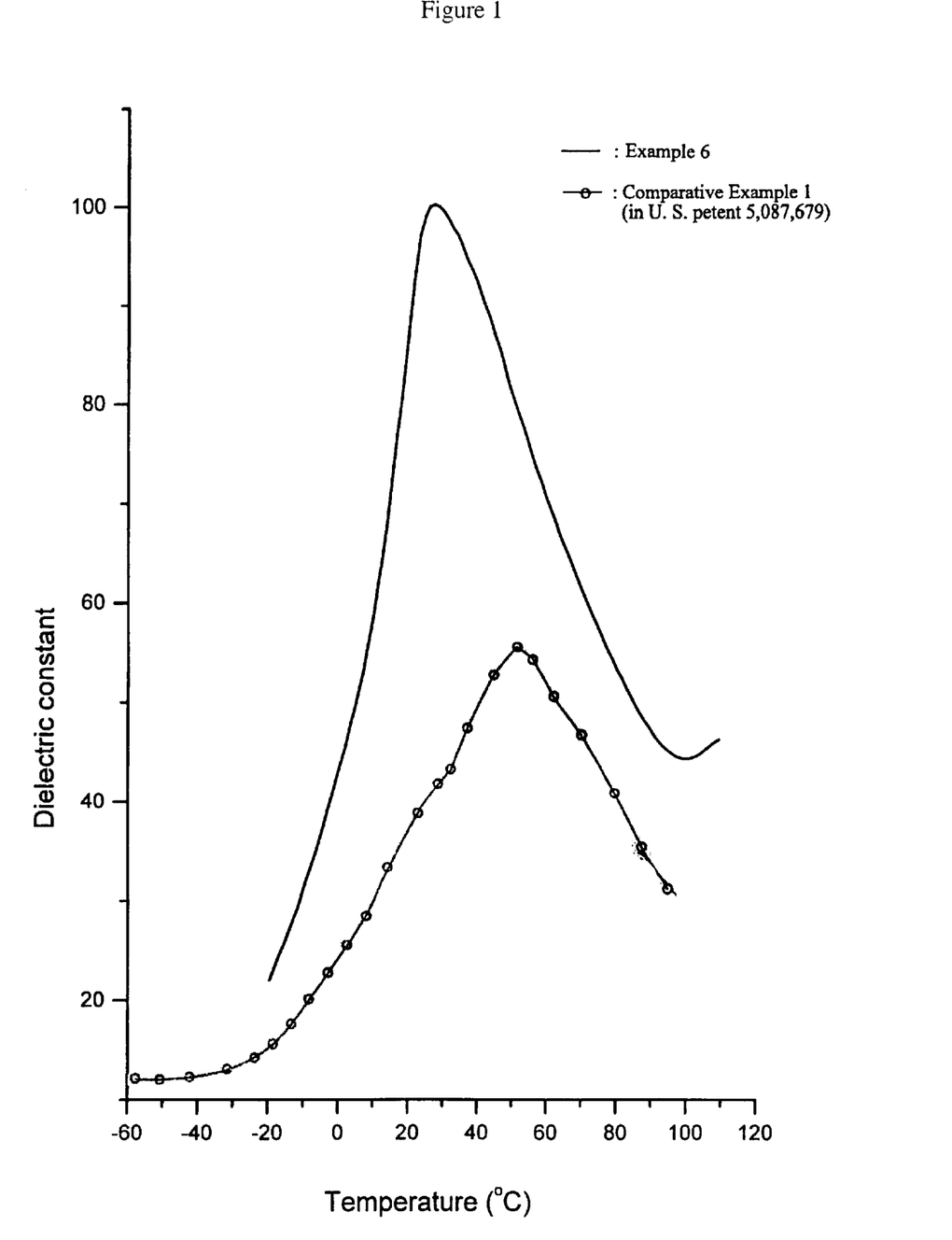
FIG. 1 is a graph comparing dielectric constants at 1 kHz of a VDF/TrFE/CTFE terpolymer in accordance with the present invention (Example 6) with a comparative VDF/TrFE/CTFE terpolymer shown in the disclosure of U.S. Pat. No. 5,087,679.
Figure 2:
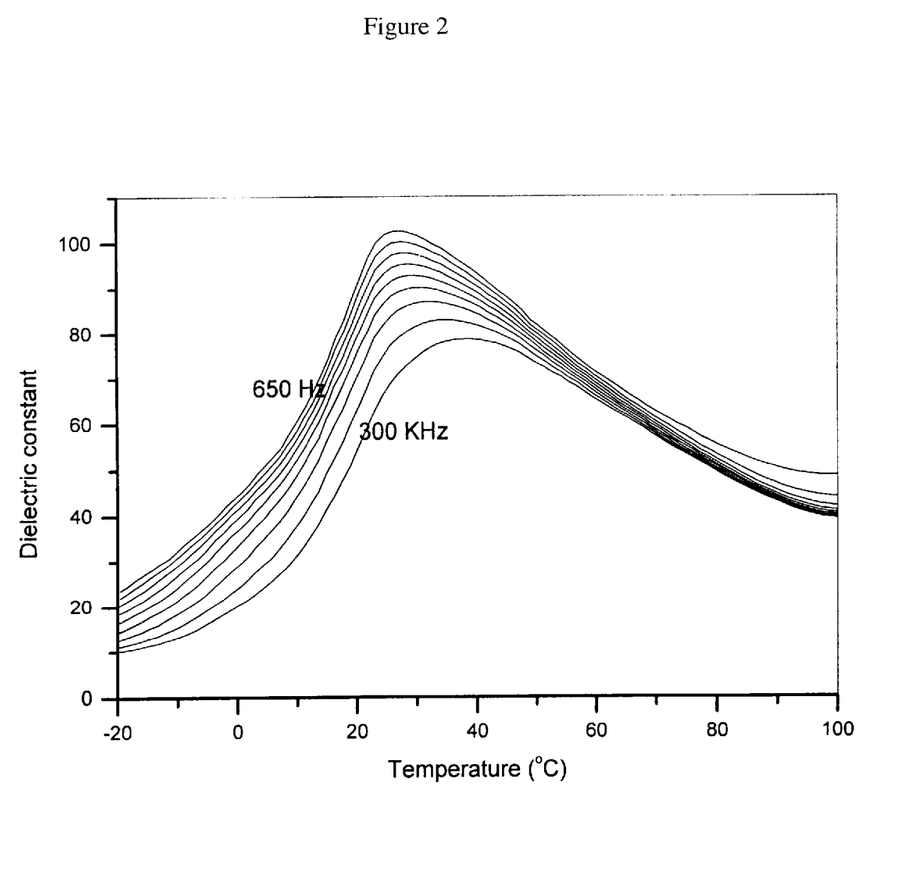
FIG. 2 is a graph illustrating the dielectric constants (with frequency range from 650 to 300,000 Hz) of a VDF/TrFE/CTFE terpolymer comprising 58 mole % VDF, 33.1 mole % TrFE and 8.9 mole % CTFE (Example 6 of the present invention).

Prior to the present invention, there have been several reports that discussed VDF/TrFE/CTFE terpolymers with significantly different thermal and electric properties. The terpolymers were prepared by emulsion and suspension polymerization processes at elevated temperature. For example, U.S. Pat. No. 4,554,335 discloses the stable dielectric constants over a wide range of temperatures in the terpolymers that are composed of 25–90 mol % of VDF units, 5–70 mol % TrFE units, and 1–13 mol % CTFE units. However, these polymers have a dielectric constant of at most about 20 at ambient temperature (20° C.) at 1 kHz. The stability of dielectric constants over a wide range of temperatures implies a terpolymer with a broad Curie (polar-nonpolar crystalline phase transition) temperature that is associated with a broad range of crystalline domains and a broad terpolymer composition distribution. U.S. Pat. No. 5,087,679 discloses VDF/TrFE/CTFE terpolymers having a TrFE content in the range of 18–22 mole %. The terpolymers disclosed in that patent exhibit a dielectric constant higher than 25 (but below than 40) at 20° C. 1 kHz. The properties that are disclosed in these two patents are very different from those exhibited by the terpolymers of the present invention, in which the VDF/TrFE/CTFE terpolymers were prepared by bulk process at ambient temperature using borane/oxygen initiation. FIG. 1 compares the dielectric constant of a terpolymer sample Example 6 in this disclosure) with that of the best sample shown in the previous disclosures (U.S. Pat. No. 5,087,679). The dielectric constant of the sample in this disclosure is significantly higher over a wide temperature range, and the dielectric constant reaches about 100 at 20° C. 1 kHz. In fact, this terpolymer (of Example 6) has a mole ratio of VDF/TrFE/CTFE=58/33.1/8.9, which is well off the best composition suggested in the previous disclosure (U.S. Pat. No. 5,087,679). In addition, the dielectric constant remains very high over a wide frequency range (650 Hz to 300 kHz), as shown in FIG. 2.

There also have been reports that discuss VDF/TrFE/HFP terpolymers containing bulky hexafluoropropene (HFP) monomer units. For example, Freimuth et al. [H. Freimuth, C. Sinn, and M. Dettenmaier, Polymer, 37, 831, 1996] disclose that the incorporation of HFP into VDF/TrFE copolymer did not affect the crystalline structure, but strongly reduced the degree of crystallinity of the resulting polymer. Sako et al. [J. Sako, T. Yagi, Y. Higashihata, M. Tatemoto, N. Tomihashi, Y. Shimizu, U.S. Pat. No. 4,577, 005] reported improved specific permittivity (dielectric constant) for VDF/TFE/HFP terpolymers, compared to VDFTFE copolymers. However, the dielectric constant of the terpolymers remained low (<20) at room temperature and 1 kHz, even after heat treatment. Tajitsu et al. [Y. Tajitsu, A. Hirooka, A. Yamagish, and M. Date, Jpn. J. Appl. Phys., 36, 6114, 1997] reported a switching phenomenon in the VDF/TrFE/HFP terpolymers having a low HFP content (<2.5 mole %). The switching phenomenon is associated with the rotations of individual molecular chains around their axes in crystalline domains. Overall, the switching time was found to have a very low dependence on the HFP content of the terpolymer. With an increase in the HFP content, both polarization and dielectric constant were found to decrease at the Curie temperature, which usually is above 40° C.

To date, methods of preparing VDF/TrFE/CTFE and VDF/TrFE/HFP copolymers have included free radical emulsion and suspension polymerization processes in aqueous solution using a batch reactor [F. J. Honn, et al., U.S. Pat. No. 3,053,818; J. E. Dohany, et al., U.S. Pat. No. 3,790,540; T. Sakagami, et al., U.S. Pat. No. 4,554,335; and H. Inukai, et al., U.S. Pat. No. 5,087,679]. The combination of heterogeneous reaction conditions, significant difference in comonomer reactivity ratios, and high monomer conversion in batch reactions inevitably results in terpolymers having a broad composition distribution and inhomogeneous crystalline domains. In addition, it is also very difficult to completely remove emulsifying and suspending agents (containing polar groups) after emulsion and suspension polymerization processes, respectively.

SUMMARY OF THE INVENTION

It is an object of the present invention to provide a new class of ferroelectric terpolymers, which exhibit an exceptionally high dielectric constant and large strain response under the influence of an electric field at ambient temperature.

It is another object to provide a new class of terpolymers, which are both melt and solution processible, and which possess a combination of uniform molecular and nano-crystalline structures, so that they have a crystal phase (polar-nonpolar) transition temperature (Curie temperature) at near ambient temperature and exhibit typical relaxor ferroelectric behavior.

Yet another object is to provide a process for preparing the subject ferroelectric terpolymers, which process utilizes homogeneous reaction conditions involving only the various monomers and a very small amount of borane and oxygen, which, in situ, form a borane/oxygen free radical initiator.

The above and other objects and advantages of the invention are achieved by providing easily processible (by solution or melt) semicrystalline terpolymers, which comprises 50–80 mole % of vinylidene fluoride (VDF), 15–40 mole % of trifluoroethylene (TrFE) and 2–20 mole % of at least one bulky monomer, such as chlorotrifluoroethylene (CTFE) or hexafluoropropene (HFP). The terpolymers have a number average molecular weight in excess of about 10,000, and preferably in excess of about 30,000. Typically, the molecular weight of the terpolymers would be on the order of from about 10,000 to about 500,000, and preferably from about 30,000 to about 100,000.

The terpolymers exhibit a high dielectric constant and a crystal phase (polar-nonpolar) transition temperature (Curie temperature) near ambient temperature. Typically, the dielectric constant of the present terpolymers would be at least about 40, and preferably at least about 50, e.g., on the order of from about 40 to about 100, and preferably from about 50 to about 100. The Curie temperature of the terpolymers typically would be from about 15° C. to about 40° C., and preferably from about 18° C. to about 35° C.

The terpolymers also exhibit an exceptionally large electrostrictive strain response under an external field at ambient temperature. As used in this specification and claims, the term "ambient temperature" is understood to be at 1 atmosphere and room temperature between 20–25° C. Also, the term "exceptionally large strain response" is understood to mean >0.5% strain at 50 MV/m and >2.5% at 100 MV/m.

As used in this specification and claims, the term "terpolymer" is meant to include not only polymers that contain units derived from three distinct monomers, but also polymers that contain units derived from greater than three monomers. For example, the term "terpolymer" includes polymers prepared from vinylidene fluoride, trifluoroethylene, and chlorotrifluoroethylene (VDF/TrFE/CTFE), as well as polymers prepared from vinylidene fluoride, trifluoroethylene, chlorotrifluoroethylene and hexafluoropropylene (VDF/TrFE/CTFE/HFP). In other words, the ferroelectric terpolymers of this invention include terpolymers of vinylidene fluoride, trifluoroethylene, and at least one bulky co-monomer, such as, chlorotrifluoroethylene (CTFE), hexafluoropropene (HFP), vinylidene chloride (VDC), tetrafluoroethylene (TFE), vinyl fluoride, vinyl chloride, acrylonitrile, acrylamide, methyl methacrylate, ethyl methacrylate, butyl methacrylate, octyl methacrylate, methacrylic acid, methyl acrylate, ethyl acrylate, butyl acrylate, octyl acrylate, 2-hydroxyethyl acrylate, glycidyl acrylate, acrylic acid, maleic anhydride, vinyl acetate, styrene, alpha-methyl styrene, trimethoxyvinylsilane, triethoxyvinylsilane and the like.

As used in this specification and claims the term "substantially uniform molecular and nano-crystalline structures" is understood to mean that the terpolymer under consideration has a narrow terpolymer composition that results in the terpolymer having uniform nano-crystalline domains. Both melting and Curie transitions in Differential Scanning Calorimetry (DSC) thermograms are strongly dependent on the terpolymer composition, with sharp melting peaks and diminished Curie (polar-nonpolar) phase transitions. The combination of significant reductions of both melting temperature and heat for polar-nonpolar crystal phase (Curie) transition indicates the terpolymers having very small crystalline domains. The crystalline phase was further examined by X-ray diffraction region for the (200) and (110) reflections. Only one narrow peak is observed in all terpolymers, and the peak systematically moves to the lower angle (2θ) as the CTFE content increases in a given terpolymer. The angle about 18.2° (corresponding to a lattice spacing of 4.9 angstrom) for the terpolymer VDF/TrFE/CTFE =61.4/25.3/13.3 indicates the paraelectric phase in this terpolymer, which is different from the ferroelectric phase of the corresponding (VDF/TrFE=60/40) copolymer. The systematic increase of the lattice spacing clearly is due to the uniform terpolymer structure, and the uniformly distributed CTFE units serve as the defects in the crystalline phase.

The terpolymers of the invention are characterized by a unique combination of substantially uniform molecular and nano-crystalline structures, such that they exhibit typical relaxor ferroelectric behavior (with extremely low heat for polar-nonpolar crystalline phase transition). The expanding and contracting of these crystalline domains under an external electric field, coupled with a large difference in the lattice strain between the polar and non-polar crystal phases, generates the exceptionally large electrostrictive strain response that is characteristic of the terpolymers of this invention. The unique properties of the present terpolymers are believed to be due, at least in part, to the new chemistry that is used in their preparation, i.e., using oxidation adducts of an organoborane as a free radical initiator in a homogeneous bulk polymerization process to prepare semicrystalline terpolymers having a homogeneous molecular structure that results in uniform crystalline structure and desirable crystalline domains.

DETAILED DESCRIPTION OF THE INVENTION

This invention discloses a new class of ferroelectric polymers that exhibit exceptionally large electrostrictive response (~4%) under external electric field at ambient temperature. These polymers are based on the terpolymer, which comprises 50–80 mole % of vinylidene fluoride (VDF), 15–40 mole % of trifluoroethylene (TrFE) and 2–20 mole % of a bulky monomer, such as chlorotrifluoroethylene (CTFE) or hexafluoropropene (HFP). These terpolymers are high molecular weight (>10,000 g/mole) semicrystalline polymers with homogeneous molecular and nano-crystalline structures.

It is well established that VDF/TrFE copolymer segments form ferroelectric crystalline domains with high Curie temperature (>50° C.), which causes the low electric field-induced mechanical response at ambient temperature. The major objective of this invention is to incorporate a certain amount of bulky monomer units into the copolymer structure with a homogeneous fashion, so that the bulky groups located along the polymer chain can reduce crystalline domain size without destroying the overall crystallinity. Therefore, the resulting terpolymer exhibits a reduced Curie temperature (ideally at ambient temperature), and still maintains high dielectric constant. Consequently, a rapid switch between polar and nonpolar crystal phases can take place at ambient temperature under an external electric field. The large difference in the lattice dimensions between the polar and nonpolar crystals causes the expansion and contraction of the terpolymer solid, which generates an exceptionally large electric-field induced mechanical response at ambient temperature.

As disclosed in Tables 1 and 2, a broad composition range of semicrystalline VDF/TrFE/CTFE and VDF/TrFE/HFP terpolymers have been prepared with high molecular weight (>10,000 g/mole). The thermal properties of the terpolymers were measured by differential scanning calarometry (Perkin-Elmer DSC-7). The terpolymers exhibited a melting temperature between about 100 and about 140° C., a heat of fusion between about 30 and about 15 J/g, and Curie temperature between about 15 and 40° C., a heat of phase transition below 3 J/g. In some terpolymers, the Curie temperature was undetectable. The actual values of the thermal properties are governed by the terpolymer composition.

Polymer films (~30 μm thickness) may be prepared either by solution casting on a glass slide from a solution containing 1–10 wt % polymer in a solvent, such as N,N-dimethylformamide, or by melt-pressing polymer powder at above 160° C. The polymer films usually are used in the form in which they are prepared. However, they may be stretched by uniaxial stretching to 2 or more times their original length at room temperature. The films may be heat treated, e.g., annealed, for example, at a temperature of from about 80 to about 110° C. under vacuum for 5 hrs. The films also may be subjected to a radiation treatment under an inert atmosphere with a dosage in the range of 5 to 30 Mrad irradiation. For electrical measurement, a gold electrode may be sputtered on a small area on both major surfaces of the polymer film. The polarization hysteresis loop of each terpolymer was measured by a Sawyer-Tower circuit, with the frequency range from about 1 to 10 Hz. The dielectric constant (with the frequency range between 650 Hz to 300 kHz) was measured by a LCR meter (HP 4284A Impedance Analyzer) at a temperature range between −20 to 120° C., and the electric field-induced strain may be measured by a bimorph-based strain sensor designed specifically for polymer film strain measurement.

The terpolymers exhibit a high dielectric constant at ambient temperature. As shown in FIGS. 1 and 2, and summarized in Table 3 (described more fully in Examples 21–32), the dielectric constant of the present terpolymers at 25° C. and 1 kHz is at least about 40, and preferably at least about 50, e.g., on the order of from about 40 to about 100, and preferably from about 50 to about 100. The high dielectric constant at ambient temperature is strongly related to the Curie temperature of the terpolymers (which is controlled in the range from 15° C. to 40° C., and preferably from about 18° C. to about 35° C.) and the very small heat of polar-nonpolar crystalline phase transition. Moreover, the dielectric peaks of terpolymer are broad (diffuse) and depend on the frequency, which are common features of a ferroelectric relaxor. The higher dielectric constant is advantageous when preparing capacitors having relatively small size and large capacity.

The terpolymers also exhibit large electric responses at ambient temperature under the external fields. FIG. 3 illustrates the diminished (and narrowed) polarization/hysteresis loops of two VDF/TrFE/CTFE terpolymers in accordance with the invention (prepared in accordance with Examples 2 and 8, respectively), compared to the wider hysteresis loop of a VDF/TrFE copolymer having a 55/45 mole ratio. The decreased width of the observed hysteresis loops is due to the incorporation of bulky monomer units into the terpolymer. The narrow hysteresis loop for the VDF/TrFE/CTFE terpolymer (Example 8) at ambient temperature, which exhibits a broad dielectric constant having a peak that shifts to a higher temperature as the frequency increases (FIG. 2), is indicative of a ferroelectric relaxor with a large electric response, which is crucial for electromechanical device applications. The associated low heat of polar-nonpolar crystalline phase transition is summarized in Table 3. In fact, no detectable Curie (polar-nonpolar crystalline phase) transition was observed for the VDF/TrFE/CTFE terpolymer (Example 8) in DSC thermograph. The crystalline domains must be very small, so that the activation energy for the crystalline phase transition is extremely small.

Figure 4:
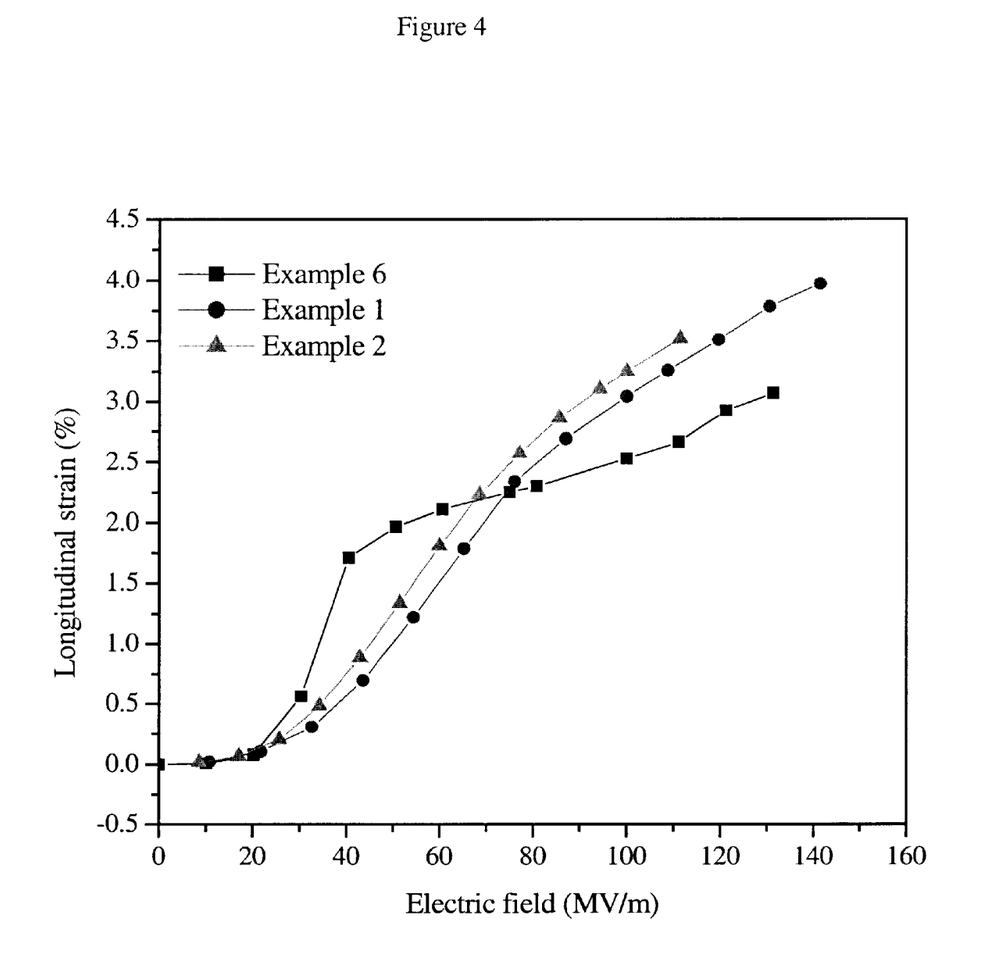
FIG. 4 is a graph illustrating the longitudinal strain (in %) of three terpolymers in accordance with the present invention versus the magnitude of an external field (in MV/m) to which the terpolymers were subjected for a VDF/TrFE/CTFE terpolymer comprising 72.2 mole % VDF, 17.8 mole % TrFE and 10 mole % CTFE (Example 1), for a VDF/TrFE/CTFE terpolymer comprising 66 mole % VDF, 22.5 mole % TrFE and 11.5 mole % CTFE (Example 2), and for a VDF/TrFE/CTFE terpolymer comprising 58 mole % VDF, 33.1 mole % TrFE and 8.9 mole % CTFE (Example 6).

FIG. 4 illustrates the longitudinal strain (in %) versus the electric field (in MV/m) for three terpolymers in accordance with the invention. The first terpolymer (described more fully in Example 1) comprises VDF/TrFE/CTFE having a mole ratio of 72.2/17.8/10, whereas the second and third terpolymers (described more fully in Examples 2 and 6) comprise VDF/TrFE/CTFE having the mole ratios of 66/22.2/11.5 and 58/33.1/8.9, respectively. As illustrated, the longitudinal strain for each terpolymer increased with increasing electric field intensity up to >0.5% at an electric field of 50 MV/m and up to >2.5% at an electric field intensity of about 100 MV/m, at ambient temperature. Moreover, it has been found that a plot of the strain (S) versus square of polarization ($P^2$) would be nearly a straight line. Based on the electrostrictive relationship $S=QP^2$, this equation yields the extrostrictive coefficient (Q) about −13.6 and −5.57 $m^4/C^2$ for terpolymers in Examples 1 and 2, respectively. Overall, the terpolymers exhibit a typical relaxor ferroelectric behavior with an exceptionally large electrostrictive strain response.

In accordance with another aspect of the invention, a novel chemistry may be used to prepare the terpolymers having a narrow composition distribution, uniform nanometer size crystalline domains and a substantial freedom from impurities. All of the above characteristics are directly responsible for the terpolymers' exceptionally large electrostrictive response. The chemistry involves a combination of a bulk polymerization process and an oxygen-activated free radical initiated process, based on the oxidation adducts of organoborane molecules. As disclosed in previous publications [T. C. Chung, W. Janvikul and H. L. Lu J. Am. Chem. Soc., 118, 705, 1996, T. C. Chung, and W. Janvikul, J. Organomet. Chem., 581, 176, 1999], certain trialkylborane molecules undergo selective oxidation reactions and form free radical initiators, in situ, for polymerization of many free radical polymerizable monomers at ambient temperature. The radical formation mechanism involves monooxidation of one B—C bond in a trialkylborane molecule (I) with a controlled amount of oxygen, as illustrated below.

"Coordination" Radical Addition Process

The R—O—O—BR'$_2$ species (II) that is formed further decomposes at ambient temperature to a R—O* alkoxyl radical (I) and a *O—BR'$_2$ borinate radical (IV). The alkoxyl radical is active in initiating polymerization of fluoro monomers, such as VDF, TrFE, CTFE, HFP, etc., at ambient temperature. On the other hand, the borinate radical is too stable to initiate polymerization due to the back-donating of the free electron to the empty p-orbital of boron. However, this "dormant" borinate radical may form a reversible bond with the radical at the growing chain end to prolong the lifetime of the propagating radical. In addition, during the propagating reaction, a coordination intermediate (V) may be formed due to the B—F acid-base complex between the active site and the incoming monomer. Such an interaction may enhance the reactivity of fluoromonomer and produce fluoro terpolymers having a narrow composition distribution. Overall, the reaction process resembles a living coordination free radical polymerization, which leads to the production of linear terpolymer having a narrow composition distribution.

As the free radical polymerizable monomer to be used as the bulky monomer, those well known in the art may be used. Specific examples of suitable bulky monomers include, but are not limited to, chlorotrifluoroethylene (CTFE), hexafluoropropene (HFP), vinylidene chloride (VDC), tetrafluoroethylene (TFE), vinyl fluoride, vinyl chloride, acrylonitrile, acrylamide, methyl methacrylate, ethyl methacrylate, butyl methacrylate, octyl methacrylate, methacrylic acid, methyl acrylate, ethyl acrylate, butyl acrylate, octyl acrylate, 2-hydroxyethyl acrylate, glycidyl acrylate, acrylic acid, maleic anhydride, vinyl acetate, styrene, alpha-methyl styrene, trimethoxyvinylsilane, triethoxyvinylsilane and the like. These radical polymerizable comonomers can be used either singly or as a combination of two or more comonomers. Preferably, chlorotrifluoroethylene (CTFE) and/or hexafluoropropene (HFP) will be used as the bulky, free radical polymerizable monomer.

The temperature for the radical polymerization may be in the range of from about −10° C. to about 40° C., and preferably from about 0° C. to 30° C. The polymerization time typically would be in the range of from about 30 minutes to 10 hours, and preferably from about 1 to 5 hours.

The homogeneous bulk polymerization conditions typically involve only monomers and a very small amount of initiator, such as a organic peroxide, and preferably a borane/oxygen adduct initiator. After the polymerization reaction, the unreacted monomers (all in gas phase) are vented under ambient temperature and pressure. When a borane/oxygen adduct is employed as the free radical polymerization initiator, any trace amount of oxidized borane/oxygen adduct is further oxidized and hydrolyzed by exposing the terpolymer product to air, and the resulting water-soluble boric acid is easily removed from the terpolymer product by water washing. Elemental analysis of the terpolymer product after the water washing step will clearly indicate that no traces of boron remain in the terpolymer product. The terpolymer composition typically would be determined by a combination of elemental analysis, $^1$H NMR measurements and $^{19}$F NMR measurements.

The terpolymers of this invention are soluble in common organic solvents, such as methylethylketone (MEK), N,N-dimethylformamide (DMF), dimethylsolfoxide (DMSO), N,N-dimethylacetamide (DMA), tetrahydrofuran (THF), and the like. The terpolymers are also melt processable at temperatures in excess of about 150° C. Furthermore, the copolymers are semicrystalline thermoplastics having a high melting temperature, a high crystallinity and a high molecular weight. Thus, typical terpolymers in accordance with the invention would exhibit a melting temperature in excess of about 100° C., for example, on the order of from about 105° C. to about 145° C., a heat of fusion in excess of about 15 J/g, for example, on the order of from about 15 to about 30 J/g, and a number average molecular weight in excess of about 10,000 g/mole, for example, on the order of from about 30,000 up to about 100,000, or more.

The present invention is illustrated by following non-limiting examples.

EXAMPLE 1

Synthesis of VDF/TrFE/CTFE Terpolymer

In a 75-ml stainless steel autoclave, 0.1 g (0.5×10$^{-3}$ moles) of tributylboron initiator was added under the argon atmosphere. The autoclave was then cooled from outside by liquid nitrogen and 16.7 g (0.26 moles) of vinylidene fluoride (VDF), 7.6 g (0.09 moles) of trifluoroethylene (TrFE) and 1.7 g (0.015 moles) of chlorotrifluoroethylene (CTFE) were distilled into the autoclave. After the monomers and tributylborane had been added to the autoclave, 0.025×10$^{-3}$ moles of oxygen was introduced into the autoclave and the autoclave was warmed to ambient temperature. The bulk polymerization was continued at ambient temperature for 5 hours before vacuum-distilling any unreacted monomers. The resulting terpolymer (6.5 g) was recovered, washed with methanol, and dried. According to chlorine analysis and $^1$H NMR measurements, the terpolymer composition comprised 72.2 mole % VDF, 17.8 mole % TrFE and 10.0 mole % CTFE. The terpolymer had a peak melting temperature of 107.8° C., based on DSC measurements (Perkin-Elmer DSC-7), and an intrinsic viscosity (MEK, 35° C.) of 0.38.

EXAMPLES 2–14

Synthesis of VDF/TrFE/CTFE Terpolymers

Following the general procedures described in Example 1, several VDF/TrFE/CTFE terpolymers were prepared using the various monomer feed ratios and reaction conditions indicated in Table 1. The resulting VDF/TrFE/CTFE terpolymers were analyzed by elemental analysis, $^1$H NMR, DSC (Perkin-Elmer DSC-7), and intrinsic viscosity (MEK, 35° C.). The resulting VDF/TrFE/CTFE terpolymer compositions and the thermal properties thereof are summarized in Table 1.

TABLE 1

| Ex. No. | Rxn time (Hrs.) | Monomer feed ratio (mol %) | | | Polymer composition (mol %) | | | Melting Temperature | | Curie temperature | | [η] (MEK) (35° C.) |
|---|---|---|---|---|---|---|---|---|---|---|---|---|
| | | VDF | TrFE | CTFE | VDF | TrFE | CTFE | Tm (° C.) | ΔH (J/g) | Tc (° C.) | ΔH (J/g) | |
| 1 | 5 | 71 | 25 | 4 | 72.2 | 17.8 | 10 | 107.8 | 17.8 | 25.0 | 0.4 | 0.38 |
| 2 | 5 | 71 | 27 | 2 | 66 | 22.5 | 11.5 | 117.2 | 21.6 | 25.2 | 1.7 | 0.42 |
| 3 | 5 | 70 | 27 | 3 | 66.1 | 21.4 | 12.5 | 115.6 | 20.5 | 25.8 | 1.8 | 0.42 |
| 4 | 5 | 64 | 32 | 4 | 63.1 | 25.4 | 11.5 | 113.7 | 18.5 | none | none | 0.49 |
| 5 | 5 | 63.5 | 31.5 | 5 | 61.4 | 25.3 | 13.3 | 111.3 | 17.8 | 19.1 | 1.5 | 0.69 |
| 6 | 5 | 54 | 42.5 | 3.5 | 58 | 33.1 | 8.9 | 130.0 | 21.3 | 31.6 | 2.5 | 0.63 |
| 7 | 4 | 50 | 47 | 3 | 53.3 | 38 | 8.7 | 123.4 | 24.2 | none | none | 0.49 |
| 8 | 5 | 50 | 47 | 3 | 55.6 | 36.1 | 8.3 | 124.6 | 21.2 | none | none | 0.54 |
| 9 | 4 | 71 | 27 | 2 | 70 | 21.8 | 8.2 | 119.2 | 24.1 | none | none | 0.48 |
| 10 | 3 | 71 | 26 | 3 | 73.2 | 17.8 | 9.0 | 110.5 | 18.3 | 38.5 | 1.3 | 0.72 |
| 11 | 1.5 | 71 | 26 | 3 | 68.8 | 21.7 | 9.5 | 109.6 | 20.8 | 28.5 | 1.5 | 0.37 |
| 12 | 3 | 49 | 47 | 4 | 57.9 | 35.4 | 6.7 | 127.3 | 20.8 | 33.8 | 1.4 | 0.75 |
| 13 | 4 | 54 | 42.5 | 3.5 | 60.0 | 35.1 | 6.9 | 126.6 | 20.9 | 33.5 | 1.6 | 0.73 |
| 14 | 3 | 54 | 42.5 | 3.5 | 59.9 | 32.8 | 7.3 | 125.0 | 19.9 | 33.9 | 1.7 | 0.70 |

None: Undetectable

EXAMPLE 15

Synthesis of VDF/TrFE/HFP Terpolymer

Into a 75-ml stainless steel autoclave that was previously cooled down to the temperature of liquid nitrogen, there was injected 5 ml of a 10 wt. % solution of trichloroacetyl peroxide initiator dissolved in chloroform ($1.5 \times 10^{-3}$ moles of trichloroacetyl peroxide). The solvent was then vacuum evaporated to dryness at −30° C., whereafter a monomer mixture comprising 0.15 moles (9.6 g) of vinylidene fluoride (VDF), 0.10 moles (8.2 g) of trifluoroethylene (TrFE), and 0.018 moles (2.7 g) of hexafluoropropene (HFP) was condensed into the autoclave at the liquid nitrogen temperature. The autoclave was then rapidly warmed in an ice-water bath to 0° C., and was held in the ice-water bath for 5 hrs. Next, any unreacted monomers were released from the autoclave to terminate the polymerization. The resulting polymer was washed with methanol and dried to give a white powder. The polymer composition was analyzed by $^{19}$F NMR and was observed to comprise 52.6 mole % VDF, 46.6 mole % TrFE and 0.8 mole % HFP. The melting temperature was determined to be 139.3° C., based on a Perkin-Elmer DSC-7 test device.

EXAMPLES 16–18

Synthesis of VDF/TrFE/HFP Terpolymers

Following the general procedures described in Example 15, several VDF/TrFE/HFP terpolymers were prepared using the monomer feed ratios indicated in Table 2. The resulting terpolymers were analyzed by $^{1}$H and $^{19}$F NMR, DSC (Perkin-Elmer DSC-7), and intrinsic viscosity (MEK, 35° C.). The composition and thermal properties of the resulting VDF/TrFE/HFP terpolymers are summarized in Table 2.

TABLE 2

| Ex. No. | Monomer feed (mol) | | | Polymer composition (mole %) | | | Tm (peak) (° C.) | Tc (peak) (° C.) | Mw × $10^{-4}$ |
|---|---|---|---|---|---|---|---|---|---|
| | VDF | TrFE | HFP | VDF | TrFE | HFP | | | |
| 16 | 0.15 | 0.13 | 0.018 | 63.4 | 35.8 | 0.8 | 139.7 | 42.4 | 18.2 |
| 17 | 0.15 | 0.12 | 0.044 | 60.5 | 37.2 | 2.3 | 131.5 | 42.4 | 5.2 |
| 18 | 0.2 | 0.18 | 0.071 | 55.2 | 42.3 | 2.5 | 129.1 | 35.6 | 17.2 |

EXAMPLE 19

Electrostrictive Response of VDF/TrFE/CTFE Terpolymer

A 25 μm thick polymer film was prepared from a sample of the VDF/TrFE/CTFE terpolymer of Example 1 by solution casting from a 10 wt % solution of the terpolymer in N,N-dimethylformamide at 70° C. After being formed, the film was annealed at 85° C. for 7 hrs. For electric measurement, a generally circular electrode (area of 7.07 mm$^2$) was formed on both major surfaces of the film by sputtering the film with gold. The dielectric constant of the terpolymer was 56.0 at 1 KHz; 25° C., as determined by an HP 4284A Impedance Analyzer. The electric field induced strain was measured at ambient temperature in the field range of 0–150 MV/m using a bimorph-based strain sensor, which consisted of a piezoelectric bimorph-based cantileverdilatometer with a lock-in amplifier (Stanford Research System SR830 DSP) and a high voltage source (KEPCO-BOP 1000M). The electrostrictive strain was observed to be 3.04% and 4.1% at 100 and 150 MV/m, respectively. The polarization hysteresis loop of the terpolymer was obtained at ambient temperature using a Sawyer Tower circuit at the frequency of 1 Hz. The terpolymer had a coercive field of 19.6 mC/m$^2$, and had a maximum polarization of 82 MV/m at ambient temperature and electric field of 100 MV/m.

EXAMPLE 20

Electrostrictive Response of VDF/TrFE/CTFE Terpolymer

A 25 μm thick polymer film was prepared from a sample of the terpolymer of Example 2 by melt pressing powdered terpolymer at 180° C. The resulting film was annealed at 85° C. for 7 hrs. For electric measurement, a circular electrode (area of 7.07 mm$^2$) was made by sputtering with gold on both surfaces of the annealed film. The terpolymer was found to have a dielectric constant of 62.0 at 1 KHz; 25° C., as determined using a HP 4284A Impedance Analyzer. The electric field induced strain was measured at ambient temperature in the field range of 0–150 MV/m using a bimorph-based strain sensor, which consisted of a piezoelectric bimorph-based cantileverdilatometer with a lock-in amplifier (Stanford Research System SR830 DSP) and a high voltage source (KEPCO-BOP 1000M). The terpolymer exhibited a 3.3% electrostrictive strain at 100 MV/m. The polarization hysteresis loop of the terpolymer was obtained at ambient temperature using a Sawyer Tower circuit at the frequency of 1 Hz. The terpolymer had a coercive field of 24.1 mC/m$^2$, and had a maximum polarization of 78 mC/m$^2$ at ambient temperature and electric field of 100 MV/m.

EXAMPLES 21–32

Electric Properties of VDF/TrFE/CTFE Terpolymers

Films (30 μm thick) were prepared from samples of the VDF/TrFE/CTFE terpolymers of Examples 3–14 and were subjected to electric measurements. The polymer films were prepared by melt pressing at 180° C., and were annealed at 85° C. for 7 hrs. A circular electrode (area of 7.07 mm$^2$) was made on each film by sputtering with gold on both major surfaces. Table 3 summarizes the polarization hysteresis loop of the terpolymers (obtained at ambient temperature using a Sawyer Tower circuit at the frequency of 1 Hz), as well as the terpolymers' dielectric constant and dielectric loss at 1 KHz; 25° C. (measured by BP 4284A Impedance Analyzer).

TABLE 3

| Example No. | polymer | Pmax (MV/m) 100 MV/m, 25° C. | Ec (mC/m$^2$) | Dielectric constant 1 KHz, 25° C. | Dielectric loss |
|---|---|---|---|---|---|
| 21 | Example 3 | — | — | 64.0 | 0.05 |
| 22 | Example 4 | 76 | 19.8 | 61.3 | 0.07 |
| 23 | Example 5 | 75 | 33.7 | 58.8 | 0.06 |
| 24 | Example 6 | 63 | 16.4 | 100 | 0.05 |
| 25 | Example 7 | 65 | 31.8 | 41.6 | 0.06 |
| 26 | Example 8 | 36 | 7.6 | 42.4 | 0.05 |
| 27 | Example 9 | 90 | 24.9 | 40.8 | 0.05 |
| 28 | Example 10 | 85 | 27.6 | 58.9 | 0.04 |
| 29 | Example 11 | 120 | 32.6 | 45.5 | 0.05 |
| 30 | Example 12 | — | — | 68.9 | 0.07 |
| 31 | Example 13 | — | — | 56.9 | 0.07 |
| 32 | Example 14 | — | — | 65.3 | 0.07 |

EXAMPLE 33

Electrostrictive Response of VDF/TrFE/HFP Terpolymer

A film having a thickness of about 25 μm was prepared from a 10 wt % solution of the VDF/TrFE/HFP terpolymer of Example 18 dissolved in N,N-dimethylformamide. The polymer film was stretched to 4 times its original length at the ambient temperature and was annealed at 110° C. for 7 hrs. A circular electrode (area 3.14 mm$^2$) was prepared by evaporating gold on both polymer film surfaces. The polarization hysteresis loop of the terpolymer film was obtained at the ambient temperature using a Sawyer Tower circuit at the frequency of 1 Hz. The coercive field of the terpolymer was determined to be 27 mC/m$^2$, and the maximum polarization was 60 MV/m. The electric field induced strain was determined at 50° C. using a bimorph-based strain sensor, which consisted of a piezoelectric bimorph-based cantilever dilatometer with a lock-in amplifier (Stanford Research System SR830 DSP) and a high voltage source (KEPCO-BOP 1000M). The terpolymer showed an electrostrictive strain of 2.5% at 50 MV/m.

What is claimed is:

1. A melt and solution processible, substantially homogeneous, semicrystalline ferroelectric terpolymer comprising from 50–80 mole % vinylidene fluoride, from 15–40 mole % trifluoroethylene, and from 2–20 mole % of at least one bulky, free-radical polymerizable monomer, wherein said terpolymer has been prepared by a combination of bulk polymerization and free radical polymerization at a temperature of from about −10 to about 40° C., and wherein said terpolymer exhibits (i) substantially uniform nanocrystalline domains, (ii) a molecular weight in excess of about 10,000 grams/mole, (iii) a Curie transition temperature of from about 15 to about 40° C., (iv) a dielectric constant of at least about 40 and up to about 100 at 1 kHz, 25° C., and (v) an electrostrictive response of at least 0.5% at 50 MV/m and at least 2.5% at 100 MV/m at ambient temperature.

2. The terpolymer according to claim 1, wherein said terpolymer has been prepared by a combination of bulk polymerization and free radical polymerization using oxygen and trialkylborane as reactants to form, in situ, an oxygen/trialkylborane adduct as the initiator for said free radical polymerization.

3. The terpolymer according to claim 2, wherein said terpolymer has been prepared at a temperature of from about 0 to about 30° C.

4. The terpolymer according to claim 2, wherein said bulky monomer is chlorotrifluoroethylene.

5. The terpolymer according to claim 2, wherein said bulky monomer is hexafluoropropylene.

6. The terpolymer according to claim 1, wherein said bulky monomer is selected from the group consisting of chlorotrifluoroethylene, hexafluoropropylene, vinylidene chloride and tetrafluoroethylene.

7. The terpolymer according to claim 2, wherein said bulky monomer is selected from the group consisting of chlorotrifluoroethylene, hexafluoropropylene, vinylidene chloride and tetrafluoroethylene.

8. A ferroelectric film prepared from the semicrystalline, ferroelectric terpolymer according to claim 1, wherein said film has been heat treated at a temperature of from about 80 to about 110° C. under vacuum for 5 hrs.

* * * * *

UNITED STATES PATENT AND TRADEMARK OFFICE
CERTIFICATE OF CORRECTION

| | | |
|---|---|---|
| PATENT NO. | : 6,355,749 B1 | Page 1 of 1 |
| APPLICATION NO. | : 09/730088 | |
| DATED | : March 12, 2002 | |
| INVENTOR(S) | : Tze-Chiang Chung et al. | |

It is certified that error appears in the above-identified patent and that said Letters Patent is hereby corrected as shown below:

Col. 1, Line 4 insert

-- STATEMENT OF GOVERNMENT SUPPORT

This invention was made with government support under Contract No. N00014-99-1-443, awarded by the National Institutes of Health. The Government has certain rights in the invention. --.

Signed and Sealed this

Twenty-third Day of November, 2010

David J. Kappos
*Director of the United States Patent and Trademark Office*